(12) United States Patent
Akenine-Möller et al.

(10) Patent No.: US 7,348,996 B2
(45) Date of Patent: Mar. 25, 2008

(54) METHOD OF AND SYSTEM FOR PIXEL SAMPLING

(75) Inventors: Tomas Akenine-Möller, Lund (SE); Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 168 days.

(21) Appl. No.: 11/087,269

(22) Filed: Mar. 23, 2005

(65) Prior Publication Data

US 2006/0061592 A1    Mar. 23, 2006

Related U.S. Application Data

(60) Provisional application No. 60/611,522, filed on Sep. 20, 2004.

(51) Int. Cl.
```
G09G 5/00      (2006.01)
G09G 5/36      (2006.01)
G06T 17/00     (2006.01)
G06K 9/40      (2006.01)
```
(52) U.S. Cl. ............ 345/611; 345/601; 345/549; 345/639; 345/428; 382/266; 382/269
(58) Field of Classification Search ............... 345/418, 345/421–422, 426, 428, 581, 611, 601, 612, 345/545, 549, 639, 643; 382/254, 266, 269
See application file for complete search history.

(56) References Cited

U.S. PATENT DOCUMENTS

| | | | |
|---|---|---|---|
| 5,239,624 A * | 8/1993 | Cook et al. ........... | 345/611 |
| 2002/0000988 A1 * | 1/2002 | Nelson et al. ........... | 345/443 |
| 2002/0140706 A1 * | 10/2002 | Peterson et al. ........... | 345/611 |
| 2004/0001067 A1 * | 1/2004 | Toksvig et al. ........... | 345/531 |
| 2004/0217973 A1 * | 11/2004 | Hunter ........... | 345/611 |
| 2006/0061590 A1 * | 3/2006 | Akenine-Moller et al. .. | 345/611 |

(Continued)

FOREIGN PATENT DOCUMENTS

EP    1431920    6/2004

OTHER PUBLICATIONS

Thomas Kollig, Alexander Keller: "Efficient Multidimensional Sampling" Computer Graphics Forum, Eurographics 2002, vol. 21, No. 3, Sep. 2002, pp. 557-563, XP002363554 The Eurographics Association and Blackwell Publishers "abstract, Figs 1-B, section 3.2".

(Continued)

*Primary Examiner*—Wesner Sajous
(74) *Attorney, Agent, or Firm*—Michael Cameron

(57) ABSTRACT

A method, system, and article of manufacture for reducing aliasing. A method in accordance with one embodiment sampling a pixel of an image at a plurality of pixel sample points to produce a corresponding plurality of pixel sample values, wherein at least one of the plurality of pixel sample points is located at a predetermined displacement from a position along an edge of the pixel. The method further includes combining the plurality of pixel sample values to produce a displayed pixel value. This Abstract is provided to comply with rules requiring an Abstract that allows a searcher or other reader to quickly ascertain subject matter of the technical disclosure. This Abstract is submitted with the understanding that it will not be used to interpret or limit the scope or meaning of the claims. 37 CFR 1.72(b).

58 Claims, 10 Drawing Sheets

U.S. PATENT DOCUMENTS

2006/0197778 A1* 9/2006 Peterson et al. ............ 345/611
2006/0203005 A1* 9/2006 Hunter ....................... 345/611

OTHER PUBLICATIONS

Mitchell D P Ed-Association for Computing Machinery: "Consequences of Stratified Sampling in Graphics" Computer Proceedings 1996 (SIGGRAPH). New Orleans, Aug. 4-9, 1996, Computer Graphics Proceedings (SIGGRAPH), New York, NY: ACM, US Aug. 4, 1996, pp. 277-280. XP000682742 'abstract, sections "Introduction", "Theoretical Analysis". "Conclusions"'.

Bilinsky I et al Vandewalle J et al: "Application of Randomized or Irregular Sampling as an Anti-Aliasing Technique" Signal Processing 5: Theories and Applications. Proceedings of Eusipco-90 Fifth European Signal Processing Conference. Barcelona, Sep. 18-21, 1990, Proceedings of the European Signal Processing Conference (EUSIPCO), Amsterdam, Elsevier, NL, vol. vol. 1 Conf. 5, Sep. 18, 1990, pp. 505-508, XP000358166 ISBN: 0-444-88636-2 "abstract, sections 1,4,6".

Akenine-Moller, Tomas; "An Extremely Inexpensive Multisampling Scheme"; Aug. 15, 2003 (version 1.11); Ericsson Mobile Platforms AB, Chalmers University of Technology, Technical Report No. 03-14; p. 1-6.

Akenine-Moller, Tomas; "FLIPQUAD: Low-Cost Multisampling Rasterization"; Apr. 23, 2002; Chalmers University of Technology, Techincal Report 02-04; p. 1-4.

"Technical Brief—HRAA: High-Resolution Antialiasing through Multisampling"; Nvidia Corporation, No Author Listed; 2001; p. 1-8.

Akenine-Moller, Tomas et al.; "Graphics for the Masses: A Hardware Rasterization Architecture for Mobile Phones"; 2003; p. 1-8.

Akenine-Moller, Tomas et al.; "Real-Time Rendering: Second Edition"; AK Peters Ltd.; Jun. 2002; pp. 84-101 and 694-697.

"Technical Brief—High-Resolution Antialiasing Subsystem"; Nvidia Corporation, No Author Listed; 2002; 12 pages.

R. Victor Klassen "Filtered Jitter", Computer Graphics forum, vol. 19(4), 223-230, 2000.

* cited by examiner

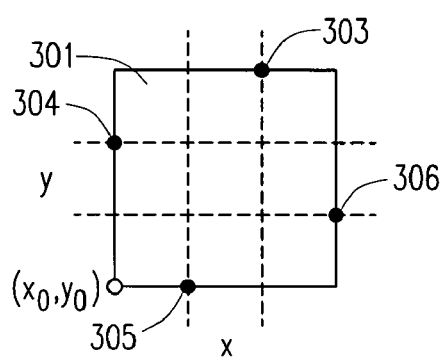
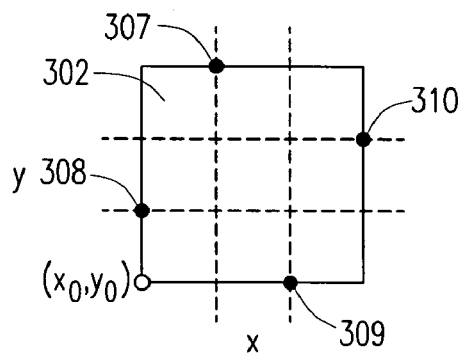
Quad A
$303 = (x0+2/3,\ y0+1)$
$304 = (x0,\ y0+2/3)$
$305 = (x0+1/3,\ y0)$
$306 = (x0+1,\ y0+1/3)$
*FIG. 3A*
Quad B
$307 = (x0+1/3,\ y0+1)$
$308 = (x0,\ y0+1/3)$
$309 = (x0+2/3,\ y0)$
$310 = (x0+1,\ y0+2/3)$
*FIG. 3B*

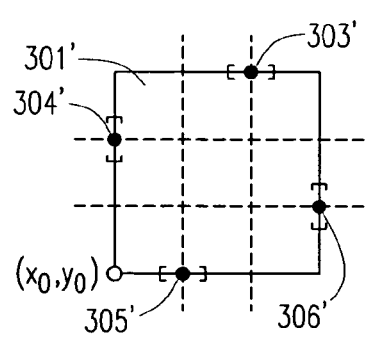
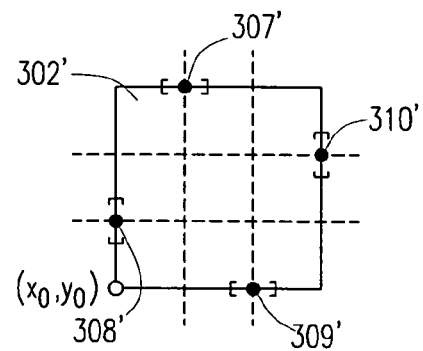
FIG. 6A   FIG. 6B
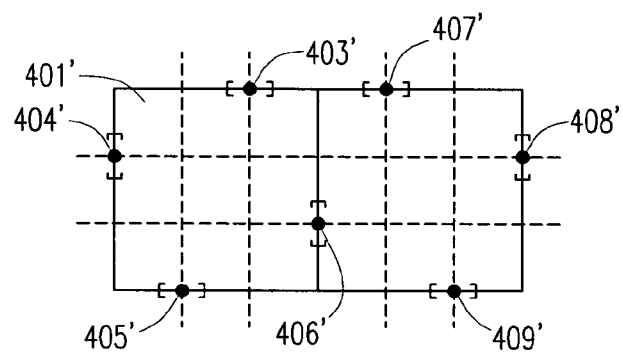
FIG. 7
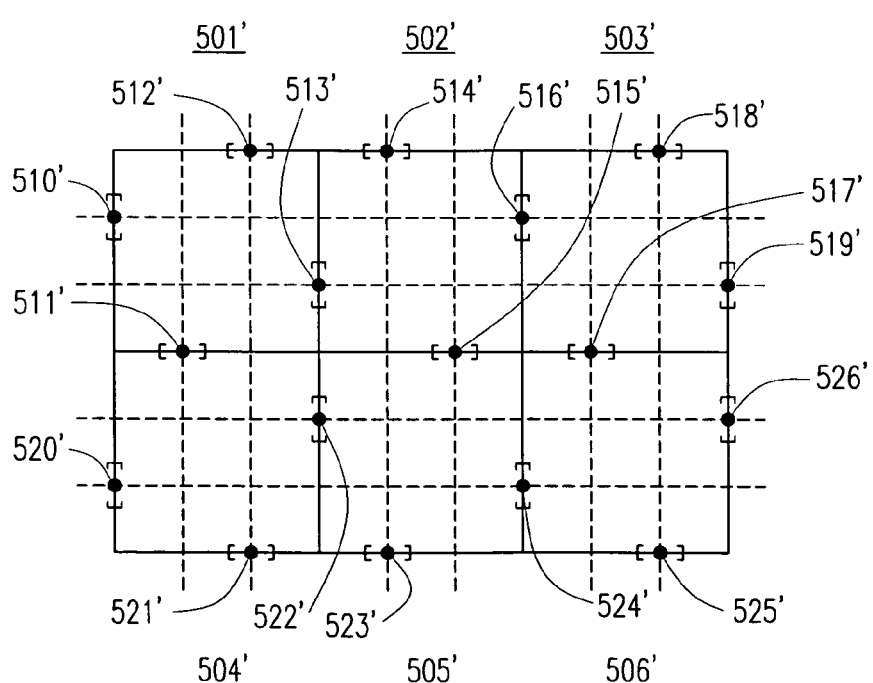
FIG. 8

$803 = (x_0, y_0+1)$ $804 = (x_0+0.5, y_0)$ $805 = (x_0+1, y_0+0.5)$ $806 = (x_0, y_0+0.5)$ $807 = (x_0+0.5, y_0)$ $808 = (x_0+1, y_0+1)$ $813 = (x_0, +0.5, y_0+1)$ $814 = (x_0, y_0)$ $815 = (x_0+1, y_0+0.5)$ $816 = (x_0, y_0+0.5)$ $817 = (x_0+0.5, y_0+1)$ $818 = (x_0+1, y_0)$

Pattern A'

Pattern B'

Pattern C'

Pattern D'

METHOD OF AND SYSTEM FOR PIXEL SAMPLING

CROSS-REFERENCE TO RELATED APPLICATIONS

This application claims priority from and incorporates by reference the entire disclosure of U.S. Provisional Application No. 60/611,522 filed Sep. 20, 2004.

BACKGROUND OF THE INVENTION

1. Technical Field

The present invention relates generally to graphic processing and more particularly, but not by way of limitation, to a method and system for producing high-quality anti-aliased graphic pictures at high frame rates with low computational cost.

2. History of Related Art

Real-time rendering of three-dimensional graphics has a number of appealing applications on mobile terminals, including games, man-machine interfaces, messaging, and e-commerce. Since three-dimensional rendering is typically a computationally expensive task, dedicated hardware must often be built to achieve acceptable performance. Innovative ways of lowering the computations complexity and bandwidth usage of this hardware architecture are thus of great importance. As described in Akenine-Möller, Tomas and Jacob Ström, "Graphics for the Masses: A Hardware Architecture for Mobile Phones," *ACM Transactions on Graphics*, vol. 22, no. 3, *Proceedings of ACM SIGGRAPH* 2003, pp. 801-808, Jul. 2003, it has been shown that the average eye-to-pixel angle is about 2-4 greater for a mobile phone than for a personal computer (PC). Thus, the image quality on mobile devices should ideally be greater than for PCs. However, mobile devices typically have fewer and less-powerful computational resources.

Since the early days of computer graphics, aliasing has been a problem when presenting still or moving pictures on a display. An example of aliasing is the stair-step effect that is visible on display terminals when a line is drawn at an angle. These stair-step artifacts are commonly referred to as "jaggies". During three-dimensional rendering, edges of polygons often produce noticeable aliasing artifacts. It is desirable to reduce these artifacts using anti-aliasing techniques.

One approach to reducing the artifacts in pictures due to aliasing is to use what is known as supersampling. In a supersampling approach, a scene is sampled in more than one point per pixel to be displayed and the final image is computed from the samples. As a special case of supersampling, multisampling techniques also sample the scene in more than one point per pixel, but the results of fragment shader computations (e.g. texture and color) are shared between the samples in a pixel. A multisampling algorithm, in general, is one that takes more than one sample per pixel in a single pass, and shares computations among the samples for a grid cell.

In the supersampling approach to anti-aliasing, a picture is rendered at a higher resolution than the final resolution that is displayed on the screen, resulting in more than one sample per pixel. The samples for each pixel are then averaged, for example, to form the color of the pixel. This is done by rendering multiple sub-pixel samples for each pixel to be displayed, and computing the value of each pixel as a weighted sum of the sub-pixel sample values. For example, each displayed pixel may be comprised of a filtered, weighted sum of a group of four sub-pixel samples inside the pixel.

As a consequence of the supersampling approach, the graphics hardware must process four times as many samples for each displayed pixel. This method of anti-aliasing is often referred to as brute-force supersampling. Brute-force supersampling increases the quality of the image greatly, but comes at a high penalty in terms of memory and rendering time. For example, assume that the width and height of a target image is w×h. If a resolution of 2 w×2 h is used for brute-force supersampling, then four samples per pixel are used, and four times as much memory, as well as four times the rasterization time, is required. Although supersampling provides good picture quality, it may result in a low frame rate due to a heavy computational burden.

In order to lower the computational burden for producing anti-aliased pixels, a modified supersampling scheme may be used in which sub-pixel sample locations are placed in positions so that the value of one or more of the sample locations may be used for calculating the final value for more than one pixel. A supersampling scheme of this kind is often referred to as a sample-sharing scheme. By sharing samples, it is possible to obtain less than four samples per pixel. Multisampling can sometimes be used to further reduce bandwidth requirements, since part of the computations may be shared by all samples inside a pixel.

The GeForce3™ graphics processing unit from NVIDIA Corporation, Santa Clara, USA provides hardware that supports supersampling and sharing of subsamples between pixels. A supersampling scheme is referred to as "Quincunx" presents a sub-pixel sample pattern in the form of a "5" on a die (i.e., five sub-pixel samples are used for calculating the value of the final pixel). Due to the placing of the sample locations in the Quincunx scheme, only two samples per pixel need to be calculated. The rest of the sample values are obtained from neighboring pixels. A center sub-pixel sample is given a weight of 0.5, while peripheral sub-pixel samples are given a weight of 0.125 each. Information regarding the Quincunx scheme may be found in "Technical Brief, HRAA: High-Resolution Antialiasing through Multisampling" from NVIDIA Corporation.

A number of gray levels between black and white in a monochrome scheme depends on how many pixel sample points are used. In an example in which four pixel sample locations are used, there will at best be three gray shades between black and white. Consequently, the Quincunx scheme described above at best provides four shades of gray. However, the effective number of gray shades for the Quincunx scheme may be as low as two. In the Quincunx scheme, the sample points form lines in vertical, horizontal, and 45° directions, which causes the Quincunx scheme to perform worse than some other schemes for some line orientations.

SUMMARY OF THE INVENTION

The present invention seeks to provide a method and apparatus for producing high-quality anti-aliased pictures at a low computational cost. One embodiment of the present invention is directed to a method for reducing aliasing. The method includes the step of sampling a pixel of an image at a plurality of pixel sample points to produce a corresponding plurality of pixel sample values, wherein at least one of the plurality of pixel sample points is located at a predetermined displacement from a position along an edge of the pixel. The method further includes combining the plurality of pixel sample values to produce a displayed pixel value. In an embodiment of the invention the predetermined displacement is determined using a lookup table. In still another embodiment of the invention the predetermined displacement is determined pseudo-randomly.

Another embodiment of the present invention is directed to a system for reducing aliasing including a sample buffer adapted to store an image, and a processor adapted to perform pixel sampling at a plurality of pixel sample points to produce a corresponding plurality of pixel sample values, wherein at least one of the plurality of pixel sample points is located at a predetermined displacement from a position along an edge of a pixel. The processor is further adapted to combine the plurality of pixel sample values to produce at least one displayed pixel value.

Another embodiment of the present invention is directed to an article of manufacture including at least one computer readable medium and processor instructions contained on the at least one computer readable medium, the processor instructions configured to be readable from the at least one computer readable medium by at least one processor and thereby cause the at least one processor to operate so as to sample a pixel of an image at a plurality of pixel sample points to produce a corresponding plurality of pixel sample values, wherein at least one of the plurality of pixel sample points is located within a predetermined displacement from a position along an edge of the pixel. The processor instructions further cause the at least one processor to operate so as to combine the plurality of pixel sample values to produce a displayed pixel value.

BRIEF DESCRIPTION OF THE DRAWINGS

A more complete understanding of the present invention may be obtained by reference to the following Detailed Description of Exemplary Embodiments of the Invention, when taken in conjunction with the accompanying Drawings, wherein:

FIGS. 3A and 3B illustrate the calculation of pixel sample locations in a pixel sample pattern;

FIGS. 6A and 6B illustrate a pixel sample pattern;

FIG. 7 illustrates a pixel sample pattern;

FIG. 8 illustrates a pixel sample pattern;

DETAILED DESCRIPTION OF EXEMPLARY EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Various embodiments of the present invention serve to reduce anti-aliasing artifacts by providing a non-periodic pixel sampling pattern. The non-periodic pixel sampling pattern can cause no particular angle of edges to be more prone to having aliasing artifacts. Various embodiments of the present invention serve to eliminate the need to implement a reflection rule for neighboring pixels and require only that a sample placed on a pixel edge be shared by a neighboring pixel sharing the pixel edge. Accordingly, no other pixel needs to be dependent upon that sample.

Figure 1A:
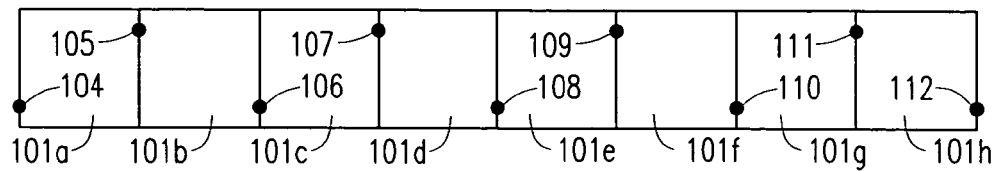
FIG. 1A illustrates an example of a pixel sampling pattern for anti-aliasing.

Referring now to FIG. 1A, a pixel sampling pattern for eight pixels 101a-101h is illustrated. The pixel sampling pattern of FIG. 1A shows nine pixel sample points 104-112 located on the edges of the pixels 101a-101h. For purposes of clarity, any pixel samples that may lie on horizontal pixel edges are not illustrated. The pixel sampling pattern of FIG. 1A possesses a periodicity of two as the pixel sampling pattern is repeated for every two pixels.

Figure 1B:
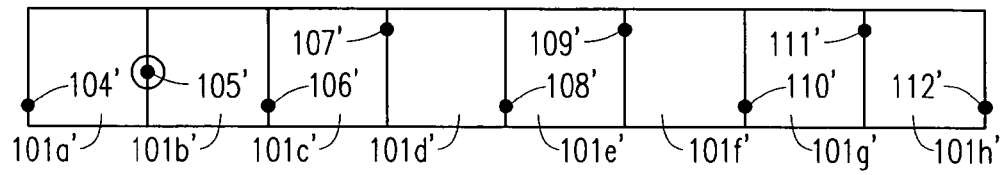
FIG. 1B illustrates a pixel sampling pattern for anti-aliasing.

Referring now to FIG. 1B, a pixel sampling pattern in accordance with an embodiment of the present invention is illustrated. The pixel sampling pattern of FIG. 1B shows nine pixel sample points 104'-112' located on the edges of the pixels 101a'-101h'. For purposes of clarity, any pixel samples that may lie on horizontal pixel edges are not illustrated. In FIG. 1B, the pixel sample point 105' is displaced by a predetermined offset along the shared edge of pixels 101a' and 101b' so that it is not at a same vertical distance along a pixel edge as any of the other pixel sample points 104' and 106'-112'. The distance that the pixel sample point 105' is displaced can be determined by any of a number of methods or algorithms. In one option, a distance that the pixel sample point 105' is displaced can be determined by a lookup from a table for one or more pixels for which the anti-aliasing scheme is to be performed. In still another option, the amount of offset can be determined pseudo-randomly. The displacement of the pixel sample point 105' produces a non-periodic pixel sampling pattern. In still another option, one or more of any of the pixel sample points 104'-112' may be displaced by a predetermined distance along a pixel edge with the requirement that sample points placed on pixel edges are shared by a neighboring pixel sharing that pixel edge.

Figure 2A:
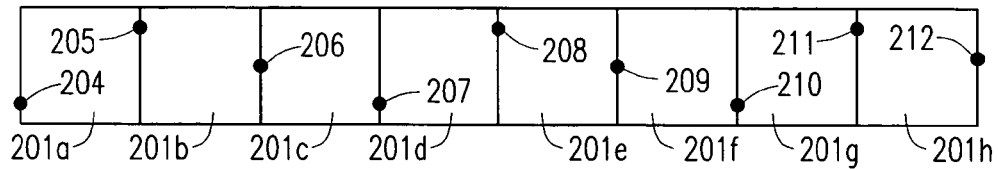
FIG. 2A illustrates another example of a pixel sampling pattern for anti-aliasing.

Referring now to FIG. 2A, a pixel sampling pattern for eight pixels 201a-201h is illustrated. The pixel sampling pattern of FIG. 2A shows nine pixel sample points 204-212 located on the edges of the pixels 201a-201h. For purposes of clarity, any pixel samples that may lie on horizontal pixel edges are not illustrated. The pixel sampling pattern of FIG. 2A possesses a periodicity of three as the pixel sampling pattern is repeated for every three pixels.

Figure 2B:
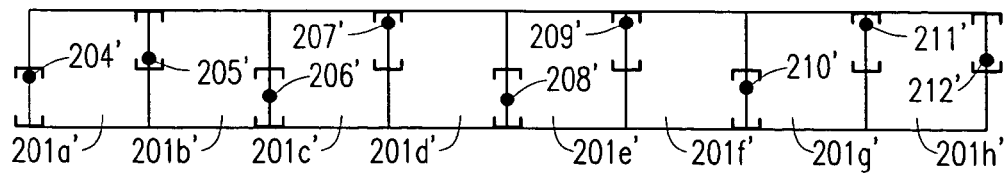
FIG. 2B illustrates a pixel sampling pattern for anti-aliasing.

Referring now to FIG. 2B, an embodiment of the present invention is illustrated in which every sample in a pixel sampling pattern is positioned at a predetermined offset along an edge of a pixel, or within a predetermined interval along an edge of a pixel. FIG. 2B illustrates a pixel sampling pattern for eight pixels 201a'-201h'. The pixel sampling pattern of FIG. 2B shows nine pixel sample points 204'-212' located on edges of the pixels 201a'-201d' and 202a'-202d'. Each of the pixel sample points 204'-212' is positioned at a predetermined point inside a predetermined interval of a pixel edge. In one option, the pixel sample points 204'-212' are pseudo-randomly positioned inside a predetermined interval of a pixel edge. In another option, the pixel sample points 204'-212' are positioned at a predetermined offset read from a lookup table such that the pixel sampling pattern does not repeat over at least two pixels.

FIG. 2B illustrates a predetermined interval associated with each of the pixel sample points 204'-212', with each predetermined interval being represented by a bracket. Through use of displacement of pixel sample points, a virtually infinite periodicity, within the limitations of a lookup table or a pseudo-random generator used to produce the displacements, of the pixel sampling pattern is produced, which results in an improved breakup of symmetry along line edges and provides better visual quality in an anti-aliased image. Although the predetermined intervals of pixel sample points 204'-212' are illustrated as extending along only a portion of a pixel edge, it should be understood that the predetermined intervals can extend along the entire length of the pixel edge so that a particular pixel sample point can be located anywhere along the pixel edge. It should also be understood that pixel sample points need not be located precisely on a pixel edge, but may instead be located near a pixel edge, for example at a distance of one-third of a pixel width from a pixel edge. It should be understood that additional pixel sample points may be located within each pixel.

FIGS. 3A and 3B illustrate a super-sampling scheme in which pixel sample points 303-306 are placed at the edges of a pixel 301, and pixel sample points 307-310 are placed at the edges of a pixel 302. This allows for pixel sample sharing between the pixel 301 and the pixel 302 in display memory if the pixel 301 and pixel 302 are positioned adjacent to one another. In the super-sampling scheme of FIGS. 3A and 3B, the samples are not placed in the corners of the pixel 301, 302 as with the Quincunx scheme. Instead, one pixel sample point is defined for each edge of the pixel 301, 302 in a rotated square-shaped configuration and is given a weight of 0.25 each. It should be understood that other weights can be used for weighting each sample point as well.

Equations for determining the precise pixel sample locations are shown below FIGS. 3A and 3B, respectively. In the equations of FIGS. 3A and 3B, the terms x0 and y0 represent an origin point of an x-axis ("x") and a y-axis ("y"), respectively as illustrated in FIGS. 3A and 3B.

Placement of the pixel sample points 303-310 as shown provides for a sampling pattern in which a relatively small number of pixel sample points are necessary. In addition, the sampling pattern provides the feature of that each sample point is located on a unique row and column of a pixel, i.e., no two pixel samples share the same column or row for a particular pixel. This is illustrated in FIGS. 3A & 3B by dashed lines wherein no two points lie on the same dashed line. The sampling pattern also serves to break the symmetry of the pixel sampling pattern configuration, which provides for an increase in the anti-aliasing effect of non-axial lines of a display, non-axial lines being lines which do not lie parallel to the horizontal axis or the vertical axes of the display. The anti-aliasing effect is even greater for lines which are near to being vertical or near to being horizontal with respect to the display. For example, assume a near to horizontal oriented edge of a polygon that is drawn on a display across one or more pixels of 301, 302. If, for example, the Quincunx scheme is used for producing an anti-aliased line representation, four sample points, one in each corner of the pixel, will be used. For some pixels, the polygon edge will cover only the top portion of a pixel, but will still cover the two uppermost pixel sample locations. Consequently, by examining the values from the pixel sample locations in the pixel, the determined anti-aliased value of the pixel will be 0.25 even if half the pixel is covered by the edge. The pixel will hence be poorly presented.

If the same situation occurs with the use of the scheme of FIGS. 3A & 3B with an edge of a polygon positioned in a near-to-horizontal line orientation that covers a small part of the top of the pixels 301, 302, the polygon edge will not cover both pixel sample locations, but only the sample location on the uppermost horizontal edge of the pixels 301, 302 due to the placement of the sample locations.

Figure 4:
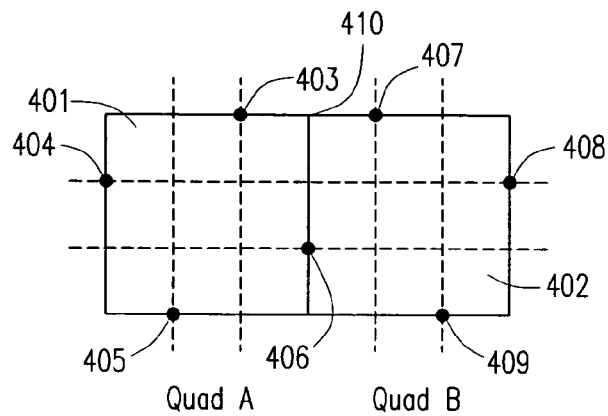
FIG. 4 illustrates a mirroring step of a pixel sample pattern.

FIG. 4 illustrates a pixel sampling pattern in which pixel sample points 403-406 of a pixel 401 are not placed in the corners of the pixel as is the case with the Quincunx scheme. A pixel sample configuration as illustrated by pixel sample points 403-406 is referred to as "quad A." Correspondingly, a pixel 402 representing a pixel sample configuration as illustrated by pixel sample points 406-409 is referred to as "quad B."

By examining the configurations of quad A and quad B side-by-side it is evident that the pixel sample points 406-409 of quad B mirror image are the corresponding pixel sample points 403-406 in quad A when reflected at a right vertical edge 410 of quad A (and consequently a left vertical edge of quad B). By mirroring the locations of the pixel sample points 403-406 and 406-409, it is possible to share the pixel sample point 406 between the two pixels and still break up the symmetry of the pixel sampling configurations to achieve a better anti-aliasing result. There is only one sample per row and one sample per column. In, for example, the Quincunx scheme, there are two samples for the top row.

Figure 5:
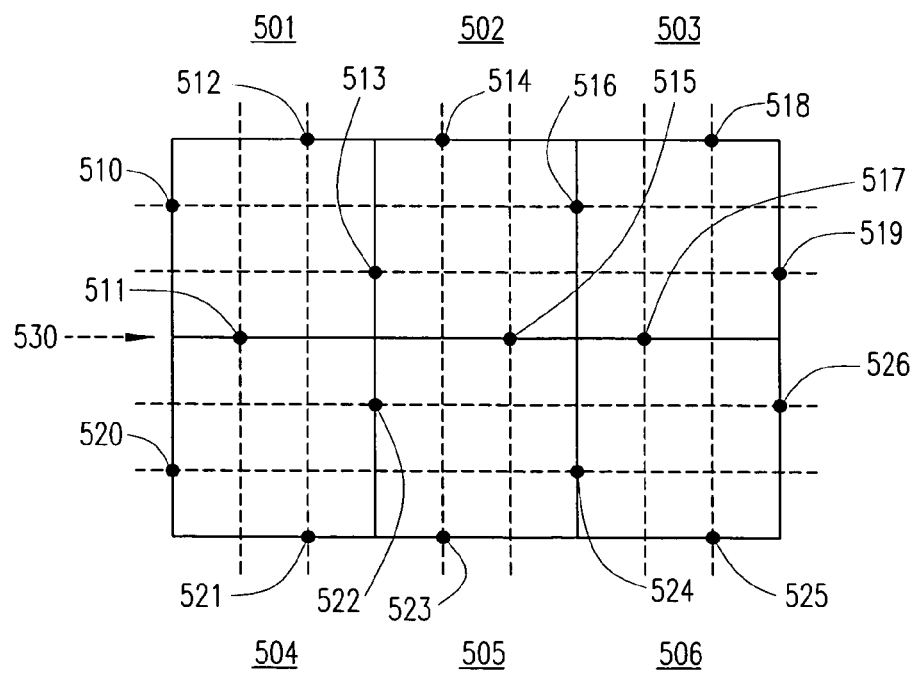
FIG. 5 illustrates another mirroring step of another pixel sample pattern.

FIG. 5 illustrates an anti-aliasing scheme in which an upper left pixel 501 contains four pixel sample points 510-513 in a quad A configuration. A pixel 502 to the right of the pixel 501 also contains four pixel sample points 513-516 in a quad B configuration, which are reflected at the right edge of the leftmost pixel 501. Moreover, a third pixel 503 also contains four pixel sample points 516-519 in a quad A configuration. As can be seen from FIG. 5, pixels 501-503 share one pixel sample point 513, 516 between each pair of pixels 501-502, 502-503. A lower row of pixels including pixels 504-506 starts with the pixel 504 presenting a quad B configuration of pixel sample points 511, 520-522. The pixel sample point 511 is shared between the pixel 504 and the pixel 501 on the row of pixels above. By examining the configurations of quad A (i.e., the topmost pixel 501) and quad B (i.e., the lower pixel 504) side-by-side, it is evident that the pixel sample points 511, 520-522 of quad B form a mirror image of the corresponding points 510-513 in quad A reflected at a bottom horizontal edge 530 of the pixel 501 (and consequently a top horizontal edge of pixel 504).

The pixel 505 contains four pixel sample points 515, 522-524 in a quad A configuration. The pixel 505 shares one pixel sample point 515 with the pixel 502 and one pixel sample point 522 with the pixel 504. The same applies to the rightmost pixel 506, which also shares two pixel sample points 517, 524 with the neighboring pixels 503, 505.

By using a mirroring scheme, all pixels, except for the uppermost and leftmost pixels 501-504 on a display, require a calculation of only two new pixel sample location values when determining the final value of the pixels 501-506. In an example in which pixel calculations are performed in a left-to-right and top-to-bottom order, for pixel 501, values for pixel samples points 510-513 are calculated. For pixel 502, values pixel sample points 514-516 are calculated, while the value of pixel sample point 513 does not have to be calculated because it has already been calculated for pixel 501. For pixel 503, the values of pixel sample points 517-519 are calculated, while the value of pixel sample point 516 does not have to be calculated because it has already been calculated for pixel 502. For pixel 504, values of pixel sample points 520-522 are calculated, while the value of pixel sample point 511 does not have to be calculated because it has already been calculated for pixel 501. For pixel 505, only the values of pixel sample points 523-524 are calculated, while the values of pixel sample points 515 and 522 do not have to be calculated because they have already been calculated for pixels 502 and 504, respectively. Similarly, for pixel 506, only the values of pixel sample points 525-526 are calculated, while the values of pixel sample points 517 and 524 do not have to be calculated because they have already been calculated for pixels 503 and 505, respectively. In another option in which the pixels may be traversed by scanning from right to left and bottom to top, all pixels except the rightmost column and the bottommost row require only two samples. In another option, the scanning direction may be altered every other line in order to render memory usage more effective. It should be understood that any number of ways understood to those of ordinary skill in the art to traverse the pixels of a geometric primitive are possible as long as all pixels inside the geometric primitive are visited by the traversal scheme.

FIGS. 6A and 6B illustrate a super-sampling scheme in which pixel sample points 303'-306' are placed at the edges of a pixel 301', and pixel sample points 307'-310' are placed at the edges of a pixel 302'. This allows for pixel sample sharing between the pixel 301' and the pixel 302' in display memory if the pixel 301' and the pixel 302' are positioned adjacent to one another. In the super-sampling scheme of FIGS. 6A and 6B, one or more of the pixel sample points 303'-306' may be located at a predetermined position within an interval along the edge of the pixels 301' and 302'. FIGS. 6A and 6B illustrate a predetermined interval associated with each of the pixel sample points 303'-310', with each predetermined interval being represented by a bracket. Although each bracket is illustrated as extending along a portion of a pixel edge, it should be understood that the pixel sample points may be positioned along any portion of the pixel edge. In the embodiment of FIGS. 6A and 6B, one pixel sample location is defined for each edge of the pixel 301, 302 and is given a weight of 0.25. Example equations for determining the precise pixel sample locations for FIG. 6A as follows:

$$303'=(x0+\tfrac{2}{3}+\text{offset}(x0, y0, 0), y0+1)$$

$$304'=(x0, y0+\tfrac{2}{3}+\text{offset}(x0, y0, 1))$$

$$305'=(x0+\tfrac{1}{3}+\text{offset}(x0, y0, 2), y0)$$

$$306'=(x0+1, y0+\tfrac{1}{3}+\text{offset}(x0, y0, 3))$$

and for FIG. 6B as follows:

$$307'=(x0+\tfrac{1}{3}+\text{offset}(x0, y0, 0), y0+1)$$

$$308'=(x0, y0+\tfrac{1}{3}+\text{offset}(x0, y0, 1))$$

$$309'=(x0+\tfrac{2}{3}+\text{offset}(x0, y0, 2), y0)$$

$$310'=(x0+1, y0+\tfrac{2}{3}+\text{offset}(x0, y0, 3))$$

where the offsets( ) function represents a function for generating a displacement value within a predetermined range, and the terms x0 and y0 represent an origin point of an x-axis ("x") and a y-axis ("y"), respectively as illustrated in FIGS. 6A and 6B. In another embodiment, it is not necessary to include the added constant in the equations for determining pixel sample locations, as this information can already be encoded within the look-up table or in the pseudo-random function. For example, the equation for pixel sample location 303' may be of the form:

$$303'=(x0+\text{offset}(x0, y0, 0), y0+1)$$

The displaced (or offset) placement of one or more of the pixel sample points 303'-310' serves to break the periodicity of the sampling pattern in order to increase the anti-aliasing effect on straight edges, especially those near 27 degrees. For sampling patterns in with displacement of pixel sample points is not performed, edges at 27 degrees may otherwise produce undesirable results due to the fact that the pixel sample points represent a square that is rotated by 27 degrees. Introducing displacements in accordance with various embodiments of the present invention will break this symmetry, producing a better result.

In one option, each of the pixel sample points 303'-310' may be positioned at a predetermined offset as read from a look-up table such that the pixel sampling pattern is not repeated for at least every pixel. In another option, each of the pixel sample points 303'-310' may be positioned using a pseudo-random number generator. In still another option, the sampling pattern may include one or more pixel sample points located inside the pixel in addition to those located at or near the edges of the pixel.

FIG. 7 illustrates a pixel sampling pattern in which pixel sample points 403'-406' of a leftmost pixel 401' are placed at predetermined positions along the edges of the pixel 401'. Pixel sample points 407'-409' are placed at the edges of a pixel 402'. The position of at least one of pixel sample points 403'-409' may be located at a predetermined position within a predetermined interval along the respective edges of the pixels 401' and 402'. FIG. 7 illustrates a predetermined interval associated with each of the pixel sample points 403'-409', with each predetermined interval being represented by a bracket. Although the bracket is illustrated as extending along a portion of a pixel edge, it should be understood that the pixel sample points may be positioned along any portion of the pixel edge.

FIG. 8 illustrates an anti-aliasing scheme in which an upper left pixel 501' contains four pixel sample points 510'-513'. A pixel 502' to the right of the pixel 501' also contains four pixel sample points 513'-516'. Moreover, a third pixel 503' also contains four pixel sample points 516'-519'. As can be seen from FIG. 8, pixels 501'-503' share one pixel sample points 513', 516' between each pair of pixels 501'-502', 502'-503'. A lower row of pixels starts with a pixel 504' presenting a configuration of pixel sample points 511', 520'-522'. The pixel sample point 511' is shared between the pixel 504' and the pixel 501' on the row of pixels above.

The pixel 505' contains four pixel sample points 515', 522'-524'. The pixel 505' shares one pixel sample point 515' with the pixel 502' on the row above and one pixel sample point 522' with the pixel 504'. The same applies to the rightmost pixel 506', which also shares two pixel sample points 517', 524' with the neighboring pixels 503', 505'. The position of at least one of pixel sample point 510'-525' may be located at a predetermined position within a predetermined interval along the respective edges of at least one of the pixels 501'-506'. In one option, the pixel sample points are positioned at a predetermined offset read from a lookup table. In another option, the pixel sample points are pseudo-randomly positioned inside a predetermined interval of a pixel edge.

All pixels, except for the uppermost and leftmost pixels 501'-504', require a calculation of only two new pixel sample point values when determining the final value of the pixels 501'-506'. In another option, all pixels except the rightmost column and the bottommost row in an image require only two samples. The sample locations in the pixels of an image may be traversed by scanning the lines from left to right. In another option, the scanning direction may be altered every other line in order to render memory usage more effective. Additionally, it should be understood that any traversal scheme can be implemented in conjunction with the supersampling scheme.

Figures 9A, 9B:
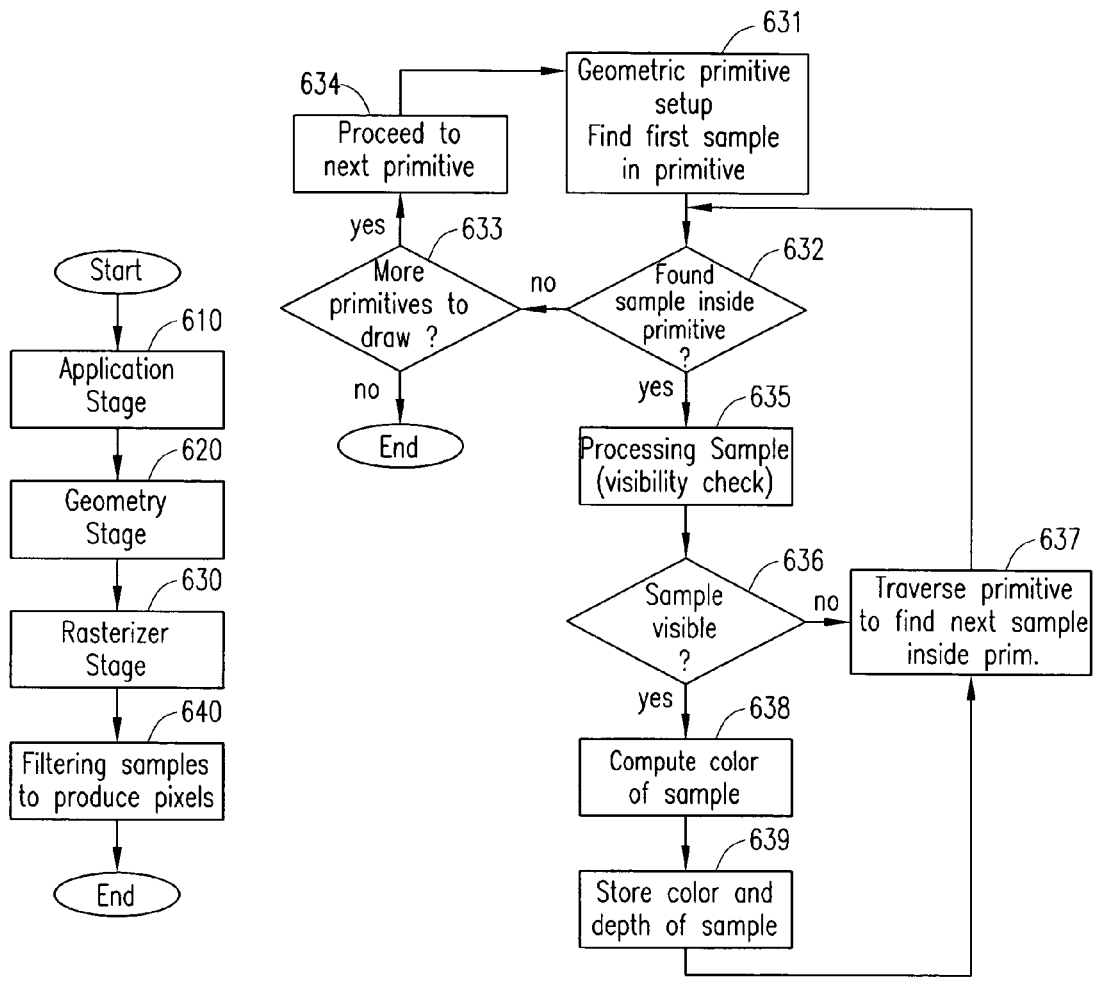
FIGS. 9A and 9B illustrate a method for producing anti-aliased pictures.
Figure 10A:
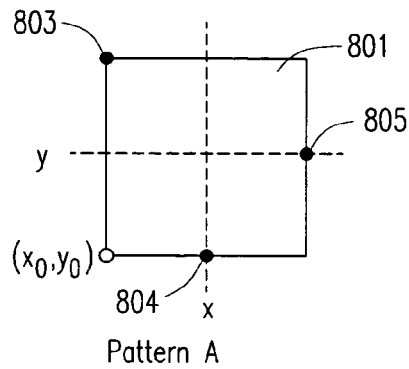
FIGS. 10A-10D illustrate a variant of a multisampling scheme including three pixel samples for each pixel.
Figure 10B:
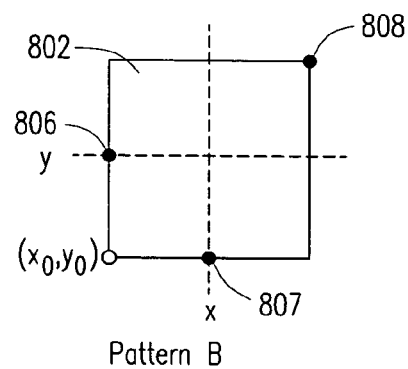
Figure 10C:
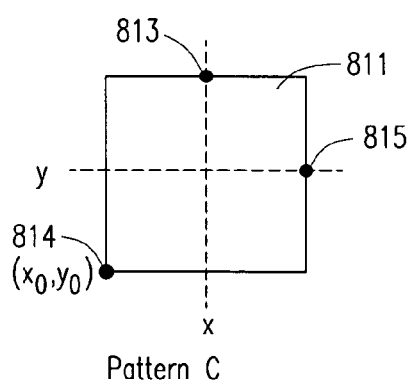
Figure 10D:
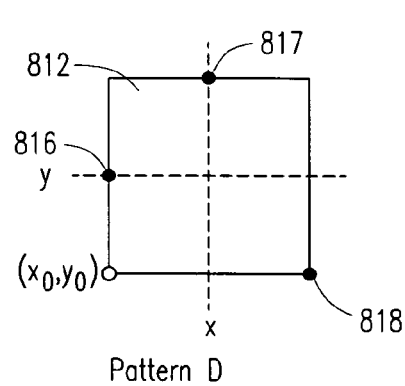

FIG. 9A is a flow chart illustrating a method for producing high-quality anti-aliased images in which one or more geometric primitives are sampled to produce an image. In an application stage (step 610), a processor (e.g, a Central Processing Unit (CPU)) runs an application program (e.g., a computer game) and generates geometric primitives (for example, polygons in the form of triangles) that are to be converted into a 2D presentation on a display.

Next, in a geometry stage (step 620), the processor or a Graphical Processing Unit (GPU) calculates the different visual effects that affect the appearance of the object on the display, such as lighting, clipping, transformations, or projections. As geometric primitives are typically used when creating 3-D objects in computer graphics, the pixel coordinates of the vertices of the geometric primitive are typically calculated.

In a rasterizer stage (step 630), triangles are drawn to a sample buffer. Perspective-correct interpolation of texture coordinates over the one or more geometric primitives is used in order to ensure that a correct projection is obtained. The rasterizer stage may be performed by the processor and/or a GPU. In addition to this, the processor or GPU may also, for example, interpolate one or more colors, another set of texture coordinates, or fog, etc. The processor or GPU may also perform Z-buffer tests, and ensure that a final pixel obtains the correct color. In a filtering stage (step 640), the sample buffer is filtered to produce pixel colors that are stored in a color buffer. The contents of the color buffer can then be displayed on the screen.

FIG. 9B is a more detailed flow chart illustrating step 630 of FIG. 9A. In step 631, geometric primitive setup for a first geometric primitive is performed in which a first sample point of a pixel sample pattern in accordance with various embodiments of the present invention is found in the geometric primitive and the process proceeds to step 632. In step 632 it is determined if the sample point has been found within the boundaries of the geometric primitive. If no sample point has been found within the geometric primitive, the process continues to step 633 in which it is determined whether there exists more geometric primitives to be drawn. If more geometric primitives exist to be drawn, the process proceeds to step 634. In step 634, the next geometric primitive is retrieved and the process returns to step 631 in which geometric primitive setup is performed. If in step 633 it is determined that no more geometric primitives exits to be drawn, step 630 ends and the process proceeds to step 640 in which filtering of samples is performed to produce filters.

If in step 632 it is determined that the sample point is found within the geometric primitive, the process proceeds to step 635 in which a visibility check is performed regarding whether the sample will be visible in the geometric primitive. In step 636 a determination is made regarding whether the sample is visible. If the sample is not visible, the process proceeds to step 637 in which the geometric primitive is traversed to find the next sample point within the geometric primitive, and the process continues to step 632.

If in step 636 a determination is made that the sample point is visible, computation of a color of the sample is performed in step 638, and in step 639 the color and depth of the sample is stored in one or more buffers, such as a sample buffer. The process then returns to step 637 in which the geometric primitive is traversed to find the next sample point within the geometric primitive.

FIGS. 10A-10D illustrate a variant of a multisampling scheme comprising three pixel sample points for each of pixels 801, 802, 811, 812. Pixel sample points 803-808, 813-818 are placed at borders of the pixel 801, 802, 811, 812. The borders of the pixels function as mirror planes for sample sharing, which allows for sharing of samples between the different pixels 801, 802, 811, 812 in a display memory.

At least one of the pixel sample points 803-808, 813-818 is placed at a corner of each pixel 801, 802, 811, 812. The term "at a corner" means that the sample is provided approximately at the corner of two intersection borders of the pixel, for example, at a distance from the corner of no greater than one-third of the length of a shortest pixel edge terminating at the corner. However, the corner sample may be slightly displaced with regard to the actual corner, as long as the corner sample may be used for the calculation of up to four pixel values.

In the multisampling scheme of FIGS. 10A-10D, a first pixel sample point is defined for a corner of two borders of the pixels 801, 802, 811, 812. Second and third pixel sample points are defined for separate borders of the pixels 801, 802, 811, 812, which do not intersect the pixel corner where the first pixel sample resides. In FIGS. 10A-10D, the second and third pixel sample of each pixel 801, 802, 811, and 812 is positioned at the center of the border between two corners. For pixel 801, pixel sample points 804, 805 are each positioned in the center of the center of a border between two corners. For pixel 802, pixel sample points 806, 807 are each positioned in the center of the center of a border between two corners. For pixel 811, pixel sample points 813, 815 are each positioned in the center of the center of a border between two corners. For pixel 812, pixel sample points 816, 817 are each positioned in the center of the center of a border between two corners. Pixel sample points 803, 808, 814, and 818 are each positioned at a corner of pixels 801, 802, 811, and 812, respectively. However, the second and third pixel sample point may be positioned at any point on the border as long as the sample may be used for the calculation of the values of two neighboring pixels. Also, in FIGS. 10A-10D, the second and third pixel sample points 804, 805, 806, 807, 813, 815, 816, 817 are positioned on the borders of their respective pixels 801, 802, 811, 812 at the same distance from a corner. In another option, the distance from a corner may be different for each of pixel sample points 804, 805, 806, 807, 813, 815, 816, 817. Each of the pixel sample points is given a weight of ⅓ (i.e., so that the sum of the weights equals 1). Another weight distribution that may be used is 0.2 for the first pixel sample and 0.4 for each of the second and third pixel sample. Any other weight distribution for the pixel samples may be used as long as their sum totals a value of one.

In FIGS. 10A-10D, a grid is superimposed over each of the pixels 801, 802, 811, 812 and defines a possible pixel sample point at a corner and wherever the grid intersects a border not intersecting the corner of pixels 801, 802, 811, 812 where the corner pixel sample point resides. Exemplary equations for determining the precise sample point pattern of each pixel 801, 802, 811, 812 are shown in FIGS. 10A-10D, respectively. In the equations of FIGS. 10A-10D, the terms x0 and y0 represent an origin point of an x-axis ("x") and a y-axis ("y"), respectively as illustrated in FIGS. 10A-10D.

Figure 11:
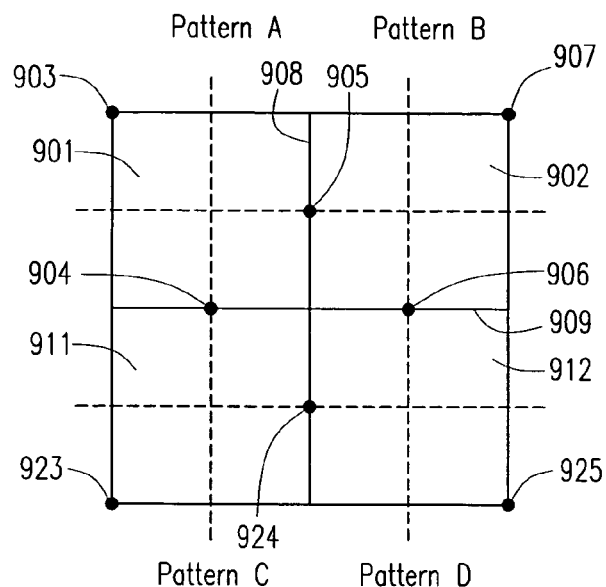
FIG. 11 illustrates another multisampling scheme.

FIG. 11 illustrates a multisampling scheme in which a leftmost pixel 901 includes one pixel sample point 903 at a corner and two pixel sample points 904-905 on separate borders of the pixel 901. In the following text, this pixel sample configuration will be referred to as Pattern A. Correspondingly, a second pixel 902 presenting a pixel sample configuration having pixel sample points 905-907 is referred to as Pattern B. By examining the configurations of Pattern A and Pattern B side-by-side, it is evident that the pixel sample points 905-907 of Pattern B are a mirror image of the corresponding points 903-905 in Pattern A. Pattern A is reflected at the right vertical border 908 of the pixel 901 to form Pattern B of the pixel 902. Thus, the Pattern B is a mirror image of the Pattern A.

The pixel sample points of the Pattern A and the Pattern B may also be mirrored in their respective bottom horizontal border 909. A third pixel 911 presenting a pixel sample configuration that is a mirror image of Pattern A when mirrored in the bottom horizontal border of pixel 901 will be referred to as Pattern C. The Pattern C has pixel sample points 904, 923-924, wherein one of the pixel sample points (i.e., the pixel sample point 904 is shared with Pattern A. A fourth pixel 912 presenting a pixel sample configuration that is a mirror image of Pattern B when mirrored in the bottom horizontal border 909 will be referred to as Pattern D. The Pattern D has pixel sample points 906, 924-925, wherein one of the pixel sample points (i.e., pixel sample point 906) is shared with Pattern B, and one pixel sample point (i.e., pixel sample point 924) is shared with Pattern C.

By mirroring the locations of the pixel sample points 903-905 across the vertical border 908 it is possible to share the pixel sample point 905 between the two pixels 901, 902 and still break up the symmetry of the configuration and achieve an improved anti-aliasing result. In the multisampling scheme of FIG. 11 there is only one sample per pixel row and pixel column. In contrast, with the Quincunx scheme, there are two samples for a top row.

Figure 12:
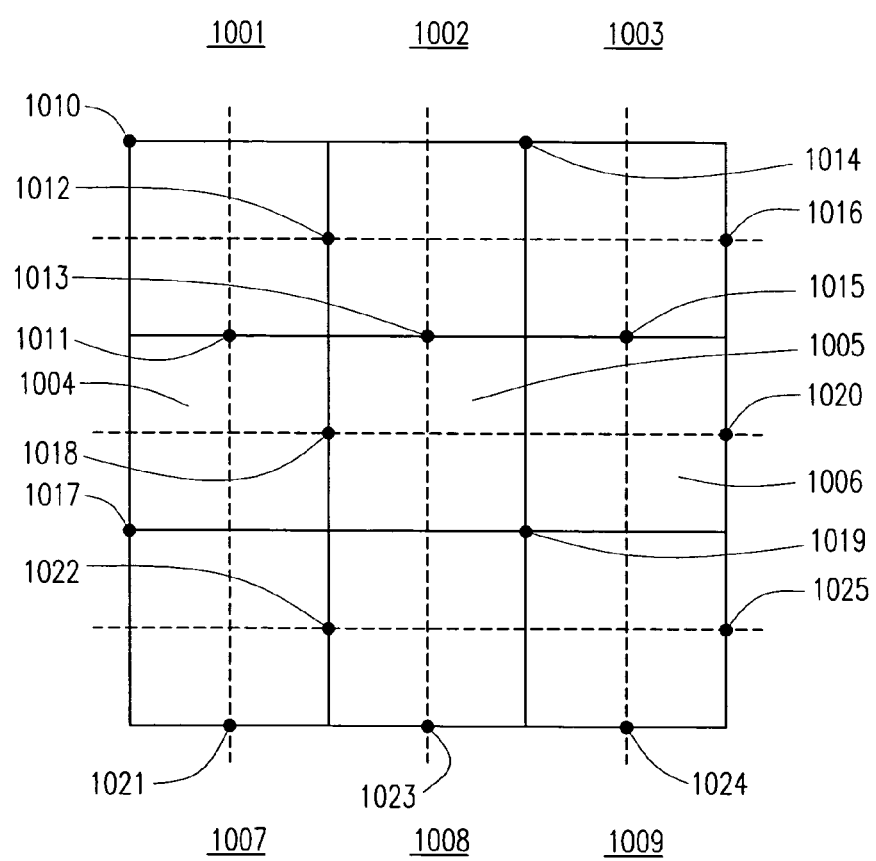
FIG. 12 illustrates the anti-aliasing scheme in a 3×3 pixel configuration including nine pixels.

FIG. 12 illustrates an anti-aliasing scheme in a 3×3 pixel configuration including nine pixels 1001-1009. The upper leftmost pixel 1001 contains three pixel sample points 1010-1012 in a Pattern A configuration. The second pixel 1002 includes three pixel sample points 1012-1014 in a Pattern B configuration, which are mirrored at the right border of the upper leftmost pixel 1001. Moreover, the pixel 1003 includes three pixel sample points 1014-1016 in a Pattern A configuration. As can be seen from FIG. 12, the upper row of pixels 1001-1003 share one pixel sample point 1012, 1014 between each pair of pixels 1001-1002, 1002-1003.

A second pixel row starts with the pixel 1004 presenting a Pattern C configuration of pixel sample points 1011, 1017-1018. The pixel sample point 1011 is shared between the pixel 1004 and the pixel 1001. The pixel 1005, on the second row, includes three pixel sample points 1013, 1018-1019 in a Pattern D configuration. The pixel 1005 shares one pixel sample point 1013 with the pixel 1002 and one pixel sample point 1018 with the pixel 1004. The same applies to the pixel 1006, on the second row, having three pixel sample points 1015, 1019-1020, which also shares two pixel sample points 1015, 1019 with the neighboring pixels 1003, 1005.

A third pixel row starts with the pixel 1007 presenting a Pattern A configuration of pixel sample points 1017, 1021-1022. The pixel sample point 1017 is shared between the pixel 1007 and the fourth 1004. The pixel 1008 includes three pixel sample points 1019, 1022-1023 in a Pattern B configuration. The pixel 1008 shares one pixel sample point 1019 with the pixel 1005 and one pixel sample point 1022 with the pixel 1007 to the left. The same applies to the pixel 1009, on the third row, and having three pixel sample points 1019, 1024-1025, which shares one pixel sample point 1019 with the neighboring pixel 1006.

By examining FIG. 12, it is evident that all pixel sample points provided at a pixel corner, except in the topmost row and the leftmost column, are shared between four pixels. Thus, the majority (for a relatively large grid of pixels) of the corner pixel samples only need to be calculated once for four pixels, wherein the calculation cost is 0.25 per pixel. The pixel sample points 1011, 1012, 1013, 1015, 1018, 1021, 1022, 1023, 1024 provided on the border not intersecting the borders of the corner pixel, which are shared between two pixels, will only have to be calculated once for two neighboring pixels. Thus, the calculation cost for these border pixels is 0.5 per pixel.

Consequently, by using a mirroring scheme, all pixels, except for the uppermost and leftmost pixels 1001-1004, 1007, require on average a calculation of only 1.25 (0.25+0.5+0.5=1.25) new pixel sample point values for determining a final value of the pixels 1001-1009. In another option, all pixels except those in the rightmost column and those in the bottommost row require only 1.25 samples. In most known multisampling configurations, at least two pixel samples must be calculated in order to determine the final value of a pixel.

The sample locations in the pixels may be traversed by scanning the lines from left to right. In another option, the scanning direction may be altered every other line in order to render memory usage more effective. It is understood that any traversal scheme can be implemented in conjunction with the multisampling scheme.

FIGS. 13A-13D illustrate a multisampling scheme. The multisampling scheme of FIGS. 13A-13D is illustrated as including three pixel samples for each pixel 801', 802', 811', 812'. The pixel sample points 803'-808', 813'-818' are placed at the borders of the pixels 801', 802', 811', 812'. The pixel sample points 801', 808', 814' and 818' are each placed at a corner of pixels 801', 802', 811', 812', respectively. In accordance with the multisampling scheme of FIGS. 13A-13D, one or more of the pixel sample points 804', 805' 806', 807', 813', 815', 816' and 817' is located at a predetermined position within an interval along an edge of pixels 801', 802', 811', 812'. FIGS. 13A-13D illustrate a predetermined interval associated with each of the pixel sample points 804', 805', 806', 807', 813', 815', 816', 817', with each predetermined interval being represented by a bracket. The term "at a corner" means that the sample is provided approximately at the corner of two intersection borders of a pixel. However, the corner sample may be displaced with regard to the actual corner, as long as the corner sample may be used for the calculation of up to four pixel values. For example, the sample point may be also be located near a corner such the sample point is located at a distance of less than or equal to one-third of a pixel width. In still another option, a sampling pattern may include one or more pixel sample points located inside the pixel in addition to those located at or near the edges or corner of the pixel.

In the multisampling scheme of FIGS. 13A-13D, first pixel sample points 803', 808', 814', 818' are defined for a corner of two borders of the pixels 801', 802', 811', 812', respectively. Second and third pixel sample points 804', 805', 806', 807', 813', 815' 816', 817' are defined for separate borders of the pixels 801', 802", 811', 812', that do not intersect the corner pixel sample. In FIGS. 13A-13D, the second and third pixel sample points 804', 805', 806', 807', 813', 815' 816', 817' of each pixel 801', 802", 811', 812' are positioned at the center of the border between two corners. However, as previously described, the second and third pixel samples 804', 805', 806', 807', 813', 815' 816', 817' may be located at any position on the border as long as the sample may be used for the calculation of the values of two neighboring pixels. Each of the pixel samples may be given a weight of ⅓ (i.e., the sum of the weights equals 1).

Thus, another exemplary weight distribution is 0.2 for the first pixel sample and 0.4 for each of the second and third pixel samples.

Figure 13A:
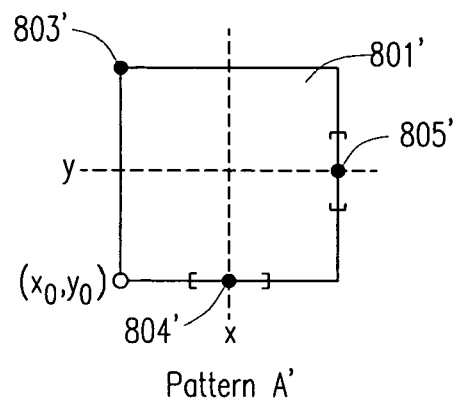
FIGS. 13A-13D illustrate a multisampling scheme.
Figure 13B:
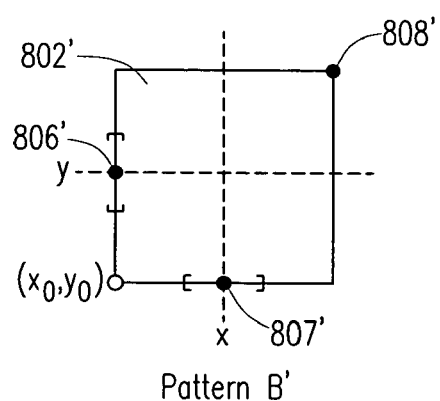
Figure 13C:
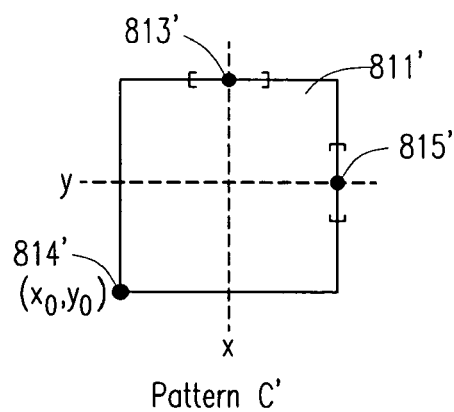
Figure 13D:
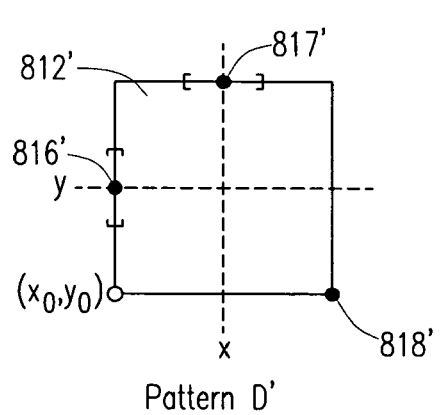

Example equations for determining a precise pixel sample point pattern of each pixel of FIG. 13A are as follows:

$$803'=(x0, y0+1)$$

$$804'=(x0+0.5+\text{offset}(x0, y0, 0), y0)$$

$$805'=(x0+1, y0+0.5+\text{offset}(x0, y0, 1))$$

for FIG. 13B as follows:

$$806'=(x0, y0+0.5+\text{offset}(x0, y0, 0))$$

$$807'=(x0+0.5+\text{offset}(x0, y0, 1), y0)$$

$$808'=(x0+1, y0+1)$$

for FIG. 13C as follows:

$$813'=(x0+0.5+\text{offset}(x0, y0, 0), y0+1)$$

$$814'=(x0, y0)$$

$$815'=(x0+1, y0+0.5+\text{offset}(x0, y0, 1))$$

and for FIG. 13D as follows:

$$816'=(x0, y0+0.5+\text{offset}(x0, y0, 0)$$

$$817'=(x0+0.5+\text{offset}(x0, y0, 1), y0+1)$$

$$818'=(x0+1, y0)$$

where the offset( ) function represents a function for generating a displacement value within a predetermined range, and the x0 and y0 terms represent an origin point of an x-axis ("x") and a y-axis ("y"), respectively as illustrated in FIGS. 13A-13D. In another embodiment, it is not necessary to include the added 0.5 constant in the equations for determining pixel sample locations, as this information can already be encoded within the look-up table or in the pseudo-random function. For example, the equation for pixel sample location 804' may be of the form:

$$804'=(x0+\text{offset}(x0, y0, 0), y0)$$

The displaced (offset) placement of the pixel sample points 803'-808', 813'-818' serves to break the symmetry of the configuration and increases the anti-aliasing effect. In one option, each of the pixel sample points 804'-807', 813', and 815'-817' may be positioned at a predetermined offset as read from a look-up table such that the pixel sampling pattern is not repeated for at least every pixel. In another option, each of the pixel sample points 804'-807', 813', and 815'-817' may be positioned using a pseudo-random number generator.

Figure 14:
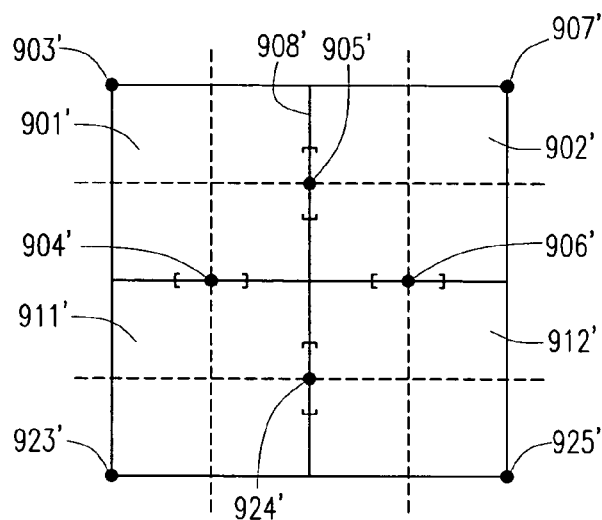
FIG. 14 illustrates a multisampling scheme.

FIG. 14 illustrates a multisampling scheme in which a leftmost pixel 901' includes one pixel sample point 903' at a corner and two pixel sample points 904'-905' at predetermined positions located within intervals along the borders of the pixel 901'. A second pixel 902' has a pixel sample point 907' at a corner and two pixel sample points 905' and 906' located at predetermined positions within intervals along borders of the pixel 902'. A third pixel 911' has a pixel sample point 923' at a corner and two pixel sample points 904' and 924' located at predetermined positions within intervals along borders of the pixel 911'. A fourth pixel 912' has a pixel sample point '925 at a corner and two pixel sample points 906' and 924' located at predetermined positions within intervals along the borders of the pixel 912'. FIG. 14 illustrates a predetermined interval associated with each of the pixel sample points 904', 905', 906', 924', with each predetermined interval being represented by a bracket. Although each bracket is illustrated as extending along a portion of a pixel edge, it should be understood that the pixel sample points may be positioned along any portion of the pixel edge. As illustrated in FIG. 14, pixel sample points 904', 923'-924' form a pixel sample pattern wherein pixel sample point 904' is shared between pixel 901' and pixel 911'. Pixel sample points 906', 924'-925' form a pixel sample pattern wherein pixel sample point 906' is shared between pixel 902' and pixel 912', and pixel sample point 924' is shared between pixel 911' and pixel 912'. The predetermined position of each pixel sample point may be determined, for example, by reference to a look-up table or pseudo-randomly.

The displaced or offset positioning of select pixel sample locations serves to break up the symmetry of the pixel sampling configuration and achieve a better anti-aliasing result. Further, there is only one sample per pixel row and one sample per pixel column. In, for example, Quincunx, there are two pixel samples for the top row of a pixel.

Figure 15:
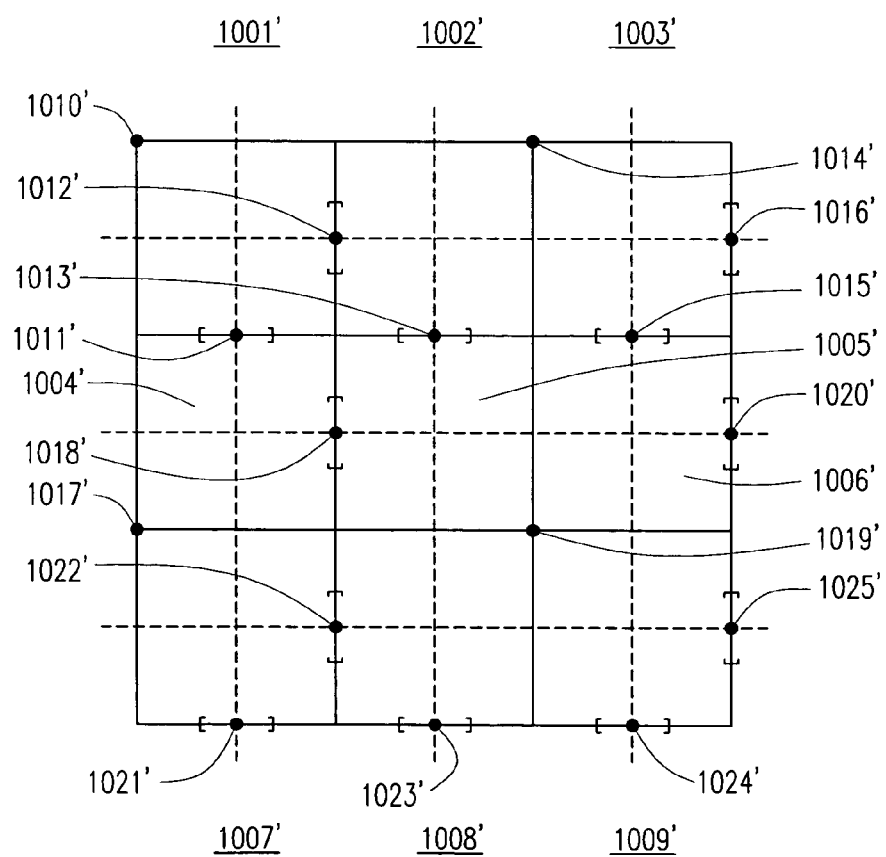
FIG. 15 illustrates an anti-aliasing scheme in a 3×3 pixel configuration.

FIG. 15 illustrates an anti-aliasing scheme in a 3×3 pixel configuration including nine pixels 1001'-1009'. The pixel 1001' contains three pixel sample points 1010'-1012'. The pixel 1002', located to the right of the pixel 1001' includes three pixel sample points 1012'-1014'. Moreover, a pixel 1003' includes three pixel sample points 1014'-1016'. As can be seen from FIG. 15, the upper row of pixels 1001'-1003' shares one pixel sample point 1012', 1014' between each pair of pixels 1001'-1002', 1002'-1003'.

A second pixel row starts with a pixel 1004' presenting a configuration of pixel sample points 1011', 1017'-1018'. The pixel sample point 1011' is shared between the pixel 1004' and the pixel 1001'. The pixel 1005', on the second row, includes three pixel sample points 1013', 1018'-1019'. The pixel 1005' shares one pixel sample point 1013' with the pixel 1002' and one pixel sample point 1018' with the pixel 1004'. The same applies to the pixel 1006', located on the second row and having three pixel sample points 1015', 1019'-1020', which also shares two pixel sample points 1015', 1019' with the neighboring pixels 1003', 1005'.

The third pixel row starts with the pixel 1007' presenting a configuration of pixel sample points 1017', 1021'-1022'. The pixel sample point 1017' is shared between the pixel 1007' and the pixel 1004'. The pixel 1008' includes three pixel sample points 1019', 1022'-1023'. The pixel 1008' shares one pixel sample point 1019' with the pixel 1005' and one pixel sample point 1022' with the pixel 1007'. The same applies to the pixel 1009', having three pixel sample points 1019', 1024'-1025', which shares one pixel sample point 1019' with the neighboring pixel 1006'. One or more of pixel samples 1011', 1012', 1013', 1015', 1016', 1018', 1020', 1021', 1022', 1023', 1024', and 1025' may be located at predetermined positions within intervals along the borders of the pixels 1001'-1009'. FIG. 15 illustrates a predetermined interval associated with each of the pixel sample points 1011', 1012', 1013', 1015', 1016', 1018', 1020', 1021', 1022', 1023', 1024', and 1025', with each predetermined interval being represented by a bracket. Although each bracket is illustrated as extending along a portion of a pixel edge, it should be understood that the pixel sample points may be positioned along any portion of the pixel edge. The predetermined position of each pixel sample point may be determined, for example, pseudo-randomly or by reference to a look-up table.

By examining FIG. 15, it is evident that all pixel sample points provided at a pixel corner, except in the topmost row and the leftmost column, are shared between four pixels. Thus, the majority (for a relatively large grid of pixels) of the corner pixel samples only need to be calculated once for four pixels, wherein the calculation cost is 0.25 per pixel. The pixel sample points 1011', 1012', 1013', 1015', 1016', 1018', 1020', 1021', 1022', 1023', 1024', and 1025' provided on the border not intersecting the borders of the corner pixel, which are shared between two pixels, will only have to be calculated once for two neighboring pixels. Thus, the calculation cost for these border pixels is 0.5 per pixel.

Consequently, all pixels, except for the uppermost and leftmost pixels 1001'-1004', 1007', require on average a calculation of only 1.25 (0.25+0.5+0.5=1.25) new pixel sample point values for determining the final value of the pixels 1001'-1009'. In another option, all pixels except the rightmost column and the bottommost row of pixels of an image require only 1.25 samples. In most known multisampling configurations, at least two pixel samples must be calculated in order to determine the final value of a pixel.

The pixel sample points in the pixels may be traversed by scanning the lines from left to right. In another option, the scanning direction may be altered every other line in order to render the memory usage more effective. It is to be understood that any traversal scheme can be implemented without departing from the principles of the invention.

By using the multisampling scheme of FIG. 15, it is only necessary to access a display memory a maximum three times to calculate the final value of a pixel. However, by providing an additional small and fast memory, such as an on-chip cache memory, for temporarily storing samples needed in one or several subsequent computations of pixel values, it is possible to decrease the necessary access to the display memory to a minimum of 1.25. By using this approach with the Quincunx scheme, it is necessary to access a memory a minimum of two times for the calculation of the final value of a pixel. Moreover, an even smaller additional memory may be utilized to store only one sample (i.e., the sample that is used for calculating the value of a first pixel and the calculation of a value of a subsequent pixel).

Referring again to FIG. 14, the final value of the pixel 901' may be calculated by retrieving pixel samples 903'-905' from the display memory. The pixel sample 905' may then be temporarily stored in the additional memory. For the computation of the final value of the pixel 902', it is only necessary to retrieve the pixel samples 906'-907' from the display memory, whereas the pixel sample 905' may be retrieved from the additional memory. Consequently, it is only necessary to access the display memory twice for the calculation of the majority of pixels of a large grid of pixels, such as, for example, a 176×174 pixel grid of a mobile terminal. Using the Quincunx scheme, it is necessary to access a display memory three times and an additional memory twice for the calculation of the final value of a pixel.

Figure 16:
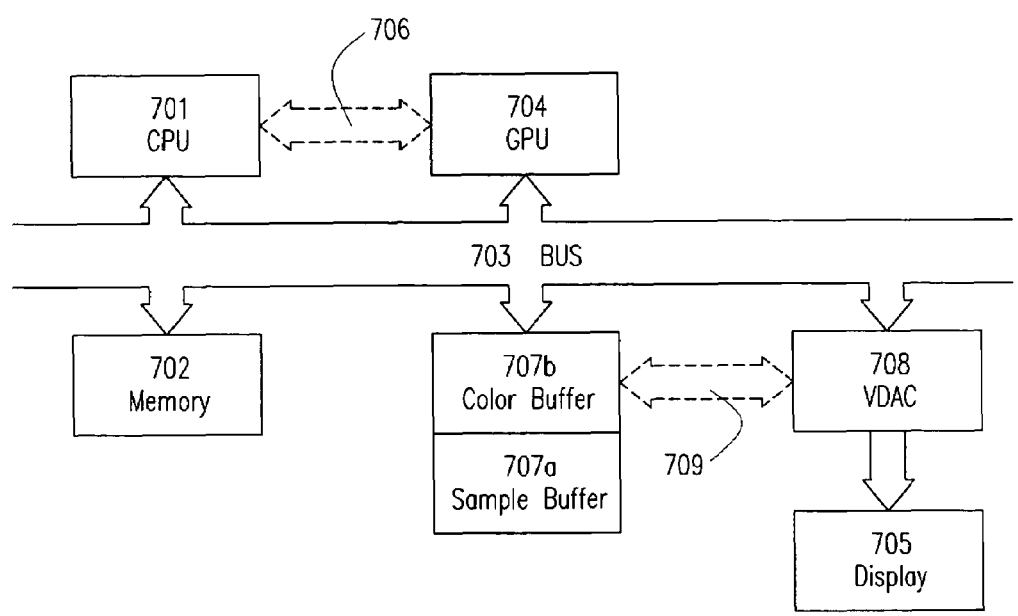
FIG. 16 is a schematic block diagram illustrating a graphics system for creating anti-aliased pictures.

FIG. 16 is a block diagram of a system for drawing one or more geometric primitives, such as a polygon, in accordance with a supersampling scheme having a pixel sample pattern. A Central Processing Unit (CPU) 701 is connected to a memory 702 via a data bus 703. The memory 702 includes an application program that may be run on the system (e.g., a computer game or a Computer Aided Design (CAD) program). The CPU 701 fetches instructions in the memory 702 and executes the instructions in order to perform specific tasks. In this context, a task for the CPU 701 is to provide a Graphics Processing Unit (GPU) 704 with information regarding objects to draw on a display 705.

The GPU 704 may be in form of a processor, such as, for example, a Digital Signal Processor (DSP), or in the form of an Application Specific Integrated Circuit (ASIC), a Field-Programmable Gate Array (FPGA), hard-wired logic, or the like. In another option, it may be executed on the CPU 701. The GPU 704 is also connected to the bus 703 but may as well be connected to the CPU 701 via a separate high-speed bus 706 in case a large amount of information is to be transferred between the CPU 701 and the GPU 704. The data transfers on the separate high-speed bus 706 will then not interfere with the data traffic on the ordinary bus 703.

A display memory 707 is also connected to the bus 703 and stores information sent from the GPU 704 regarding pictures (i.e., frames) that are to be drawn on the display 705. More specifically, the display memory contains a sample buffer 707*a* and a color buffer 707*b*. The sample buffer 707*a* contains approximately twice as many samples as there are pixels in the final color buffer 707*b*. The color buffer 707*b* holds the colors of the pixels to be displayed on screen after the rendering of an image is complete. As with the interconnection between the CPU 701 and the GPU 704, the display memory 707 may be connected directly to the GPU 704 via a separate, high-speed bus. Since the GPU 704 and the display memory 707 are typically used for producing moving images, the link between these two units is typically desired to be as fast as possible and not block the normal traffic on the bus 703.

The display memory 707 is connected to a Video Digital to Analog Converter (VDAC) 708, either via the shared bus 703 or by a separate high-speed bus 709, which reads the information from the color buffer 707*b* and converts it to an analog signal (e.g. a Red, Green, Blue (RGB) composite signal) that is provided to the display 705 in order to draw individual pixels on the display 705. The GPU 704 performs a supersampling or multisampling procedure using a pixel sampling pattern as described herein to produce the pixels held in the color buffer 707*b*.

Although the previous Detailed Description describes example embodiments in which the positioning of pixel sample points may be determined using a table look-up or pseudo-random method, it should be understood that other methods of positioning pixel sample points may be used in accordance with the principles of the invention.

The previous Detailed Description is of embodiment(s) of the invention. The scope of the invention should not necessarily be limited by this Description. For example, it should be understood that the present invention can be used with any sample scheme that places samples on the edges of pixels. It should also be understood that the supersampling scheme of the various described embodiments of the present invention may be included in a number of devices including a computer and a mobile terminal. The scope of the invention is instead defined by the following claims and the equivalents thereof.

What is claimed is:

1. A method for reducing aliasing, the method comprising:
   sampling a pixel of an image at a plurality of pixel sample points to produce a corresponding plurality of pixel sample values;
   wherein at least one of the plurality of pixel sample points is located at a predetermined displacement from a position along an edge of the pixel, wherein the displacement is always along the edge on which the sample point is located; and
   combining the plurality of pixel sample values to produce a displayed pixel value.

2. The method of claim 1, wherein the predetermined displacement is determined using a lookup table.

3. The method of claim 1, wherein the predetermined displacement is determined pseudo-randomly.

4. The method of claim 3, wherein the pseudo-randomly predetermined displacement is determined using a pseudo-random number generator.

5. The method of claim 1, wherein at least one of the plurality of pixel sample points is shared with at least one pixel sample point of a neighboring pixel.

6. The method of claim 1, wherein the step of combining the plurality of pixel sample values comprises determining an average of the plurality of pixel sample values.

7. The method of claim 1, wherein the plurality of pixel sample values comprises a plurality of color values.

8. The method of claim 1, wherein the displayed pixel value comprises a color value.

9. The method of claim 1, wherein the predetermined displacement comprises a position within a predetermined interval along the edge of the pixel.

10. The method of claim 1, wherein the predetermined displacement is equal to a value of zero.

11. The method of claim 1, wherein at least one of the plurality of pixel sample points corresponds to at least one pixel sample point of a second pixel, the second pixel being adjacent to the sampled pixel.

12. The method of claim 1, wherein sample points of a plurality of pixels comprises a substantially non-periodic sample pattern.

13. The method of claim 1, wherein the plurality of pixel sample points consists of four pixel sample points.

14. The method of claim 1, wherein each of the plurality of pixel sample points is positioned on an edge of the pixel.

15. The method of claim 1, wherein each of the plurality of pixel sample points is located at a predetermined displacement from a position along an edge of the pixel.

16. The method of claim 1, wherein the plurality of pixel sample points consists of three pixel sample points.

17. The method of claim 1, wherein the plurality of pixel sample points comprises:
   a first pixel sample point located at a corner of the pixel;
   a second pixel sample point located along a first edge of the pixel; and
   a third pixel sample point locate along a second edge of the pixel.

18. The method of claim 17, wherein at least one of the second pixel sample point and the third pixel sample point is located at a predetermined displacement from a position along an edge of the pixel.

19. A system for reducing aliasing, the system comprising:
   a sample buffer adapted to store an image;
   a processor adapted to perform pixel sampling at a plurality of pixel sample points to produce a corresponding plurality of pixel sample values;
   wherein at least one of the plUrality of pixel sample points is located at a predetermined displacement from a position along an edge of a pixel, wherein the displacement is always along the edge on which the sample point is located; and
   wherein the processor is further adapted to combine the plurality of pixel sample values to produce at least one displayed pixel value.

20. The system of claim 19 further comprising a color memory adapted to store the at least one displayed pixel value.

21. The system of claim 19, wherein the processor comprises a central processing unit (CPU).

22. The system of claim 19, wherein the processor comprises a graphics processing unit (GPU).

23. The system of claim 19, wherein the step of combining the plurality of pixel sample values comprises determining an average of the plurality of pixel sample values.

24. The system of claim 19, wherein the plurality of pixel sample values comprise color values.

25. The system of claim 19, wherein the at least one displayed pixel value comprises a color value.

26. The system of claim 19, wherein the predetermined displacement is determined using a lookup table.

27. The system of claim 19, wherein the predetermined displacement is determined pseudo-randomly.

28. The system of claim 27 further comprising a pseudo-random number generator adapted to determine the pseudo-randomly predetermined displacement.

29. The system of claim 19, wherein the predetermined displacement comprises a position within a predetermined interval along the edge of the pixel.

30. The system of claim 19, wherein the predetermined displacement is equal to a value of zero.

31. The system of claim 19, wherein at least one of the plurality of pixel sample points corresponds to at least one pixel sample point of an adjacent pixel of the image.

32. The system of claim 19, wherein at least one of the plurality of pixel sample points corresponds to at least one pixel sample point of a second pixel, the second pixel being adjacent to the sampled pixel.

33. The system of claim 19, wherein sample points of a plurality of pixels comprises a substantially non-periodic sample pattern.

34. The system of claim 19, wherein the plurality of pixel sample points consists of four pixel sample points.

35. The system of claim 19, wherein each of the plurality of pixel sample points is positioned on an edge of the pixel.

36. The system of claim 19, wherein each of the plurality of pixel sample points is located at a predetermined displacement from a position along an edge of the pixel.

37. The system of claim 19, wherein the plurality of pixel sample points consists of three pixel sample points.

38. The system of claim 19, wherein the plurality of pixel sample points comprises:
- a first pixel sample point located at a corner of the pixel;
- a second pixel sample point located along a first edge of the pixel; and
- a third pixel sample point locate along a second edge of the pixel.

39. The system of claim 38, wherein at least one of the second pixel sample point and the third pixel sample point is located within a predetermined displacement from a position along an edge of the pixel.

40. An article of manufacture for reducing aliasing, the article of manufacture comprising:
- at least one computer readable medium;
- processor instructions contained on the at least one computer readable medium, the processor instructions configured to be readable from the at least one computer readable medium by at least one processor and thereby cause the at least one processor to operate so as to:
  - sample a pixel of an image at a plurality of pixel sample points to produce a corresponding plurality of pixel sample values;
  - wherein at least one of the plurality of pixel sample points is located at a predetermined displacement from a position along an edge of the pixel, wherein the displacement is always alone the edge on which the sample point is located; and
  - combine the plurality of pixel sample values to produce a displayed pixel value.

41. The article of manufacture of claim 40, wherein the predetermined displacement is determined using a lookup table.

42. The article of manufacture of claim 40, wherein the predetermined displacement is determined pseudo-randomly.

43. The article of manufacture of claim 42, wherein the pseudo-randomly predetermined displacement is determined using a pseudo-random number generator.

44. The article of manufacture of claim 40, wherein at least one of the plurality of pixel sample points is shared with at least one pixel sample point of a neighboring pixel.

45. The article of manufacture of claim 40, wherein the combining of the plurality of pixel sample values comprises determining an average of the plurality of pixel sample values.

46. The article of manufacture of claim 40, wherein the plurality of pixel sample values comprises a plurality of color values.

47. The article of manufacture of claim 40, wherein the displayed pixel value comprises a color value.

48. The article of manufacture of claim 40, wherein the predetermined displacement comprises a position within a predetermined interval along the edge of the pixel.

49. The article of manufacture of claim 40, wherein the predetermined displacement is equal to a value of zero.

50. The article of manufacture of claim 40, wherein at least one of the plurality of pixel sample points corresponds to at least one pixel sample point of a second pixel, the second pixel being adjacent to the sampled pixel.

51. The article of manufacture of claim 40, wherein sample points of a plurality of pixels comprises a substantially non-periodic sample pattern.

52. The article of manufacture of claim 40, wherein the plurality of pixel sample points consists of four pixel sample points.

53. The article of manufacture of claim 40, wherein each of the plurality of pixel sample points is positioned on an edge of the pixel.

54. The article of manufacture of claim 40, wherein each of the plurality of pixel sample points is located at a predetermined displacement from a position along an edge of the pixel.

55. The article of manufacture of claim 40, wherein the plurality of pixel sample points consists of three pixel sample points.

56. The article of manufacture of claim 40, wherein the plurality of pixel sample points comprises:
- a first pixel sample point located at a corner of the pixel;
- a second pixel sample point located along a first edge of the pixel; and
- a third pixel sample point locate along a second edge of the pixel.

57. The article of manufacture of claim 56, wherein at least one of the second pixel sample point and the third pixel sample point is located at a predetermined displacement from a position along an edge of the pixel.

58. The method of claim 1, wherein the step of sampling a pixel of an image at a plurality of pixel sample points to produce a corresponding plurality of pixel sample values does not require mirroring of the sample points.

* * * * *